J. Matthews, Jr.,
Pipe Coupling,
Nº 61,626.   Patented Jan. 29, 1867.
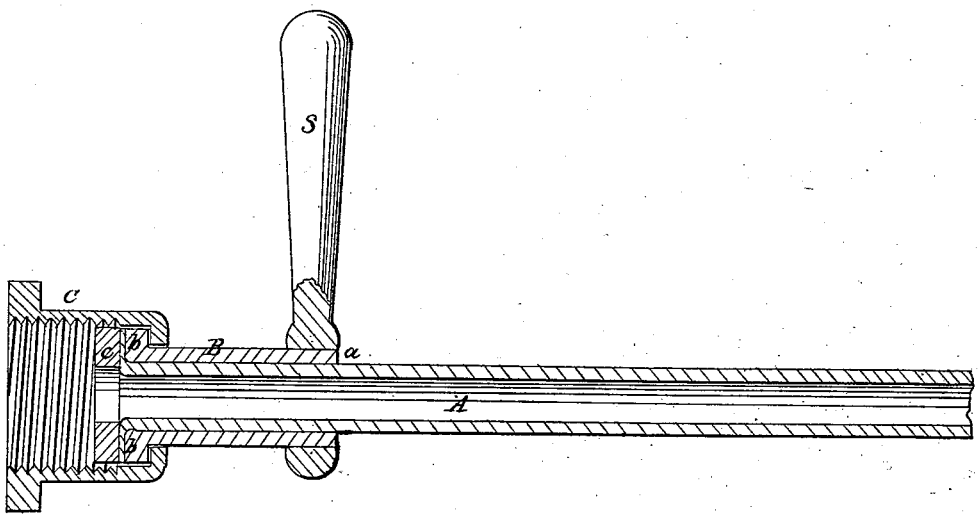
Witnesses
J. W. Combs
G. W. Reed
Inventor
John Matthews Jr

United States Patent Office.

JOHN MATTHEWS, JR., OF NEW YORK, N. Y.

Letters Patent No. 61,626, dated January 29, 1867.

IMPROVEMENT IN PIPE-COUPLINGS.

*The Schedule referred to in these Letters Patent and making part of the same.*

TO ALL WHOM IT MAY CONCERN:

Be it known that I, JOHN MATTHEWS, Jr., of the city, county, and State of New York, have invented a new and useful Improvement in Pipe-Connections of Mineral and Soda-Water or other like Fountains, of which the following is a full, clear, and exact description, reference being had to the accompanying drawing, which forms part of this specification, and which represents a longitudinal section of portion of a pipe and coupling in illustration of my improvement.

In mineral and soda-water fountains and apparatus, it is well understood that the chemical peculiarity of the liquids which they dispense—and the same remarks apply to many other liquids—renders it very desirable that there should be no exposure of such liquids to the usual brass coupling that unites the pipe with the nozzle of the fountain, or that unites, in fact, any two parts through which the liquid passes. The pipe or pipes themselves, being made of a block tin or other metal than brass or copper, are comparatively secure against such pernicious action or effect, but the brass couplings that connect them with the nozzle of the fountain and other parts together, have generally been more or less exposed to the action of the liquid, which is consequently rendered impure, and the couplings themselves injured by it. That there has hitherto been a difficulty in avoiding this objectionable exposure of the brass couplings will be apparent when it is considered that, in establishing such pipe connections, it is usual to cup the end of the pipe A (see accompanying drawing) for reception within it of the end $a$ of the swivel B, and afterwards to fill up the intervening space at the junction with solder, or else to connect the pipe A and end $a$ of the swivel by a but-joint of solder. Thus, the tin or other pipe A does not protect the brass swivel B, nor the swivel, in point of strength, the pipe A, as it does in my improvement. To remedy this I continue the pipe A, as shown in the drawing, throughout the length of the swivel B, and, it may be, to project a little beyond the face end $b$, when it may be melted down over and on said face, or be attached by solder thereto, especially if the pipe be of silver or other less fusible metal than tin; the face $b$ presenting a much more accessible surface for so sweating or spreading or attaching by solder the end of the pipe A than would the outer end $a$. Such connection also forms not only a tight joint and protective coating to the swivel against pernicious effects of the liquid, but also a much stronger junction of the pipe and swivel; and the swivel or sleeve B, having its flange face, $b$, made solid with it, the nut C that establishes the connection of the swivel with, say the nozzle of the fountain, a soft washer, $c$, intervening, will, by its lock over said flange or collar, $b$, make the connection without risk of breakage; and, by the swivel protecting the pipe, the latter is relieved of being cut, bent, or broken by the back overlapping collar of the nut. Furthermore, I solder or permanently secure a handle, S, on the swivel B, which prevents, when making nut connection with the nozzle or adjoining pipe, all undue strain upon the swivel or pipe A to injure or detach them. The same also forms at all times a convenient hold on the swivel, and avoids the marking and slipping which are common to a wrench separately applied. This mode, then, of forming the pipe connections possesses the advantage of greater convenience and increased strength, besides giving the desired protection in so cheap and simple yet perfect a manner as to make it a *bona fide* improvement in all fountains for dispensing liquids of the character here referred to, tending alike to preserve the coupling, and keep pure or unadulterated, and, as it may be termed, free from poison, the beverage itself.

What I claim as new and useful, and desire to secure by Letters Patent, is—

1. The method of forming a swivel or screw connection of a metallic pipe or pipes by passing the end of the pipe through the swivel, and flanging it on the face of the collar $b$, substantially as and for the purposes specified.

2. The nut C, pipe A, and swivel B, having a flange or collar $b$ and handle S permanently secured to the swivel, all arranged and combined essentially as shown and described.

JOHN MATTHEWS, JR.

Witnesses:
A. LE CLERC,
J. W. COOMBS.